(No Model.) 7 Sheets—Sheet 1.

J. S. H. PELLAT.
TRAIN SIGNALING APPARATUS.

No. 509,447. Patented Nov. 28, 1893.

Witnesses:
L. M. Hachschlager
Charles E. Smith

Inventor
Joseph S. H. Pellat
By Briesen & Knauth
his Attorneys.

THE NATIONAL LITHOGRAPHING COMPANY,
WASHINGTON, D. C.

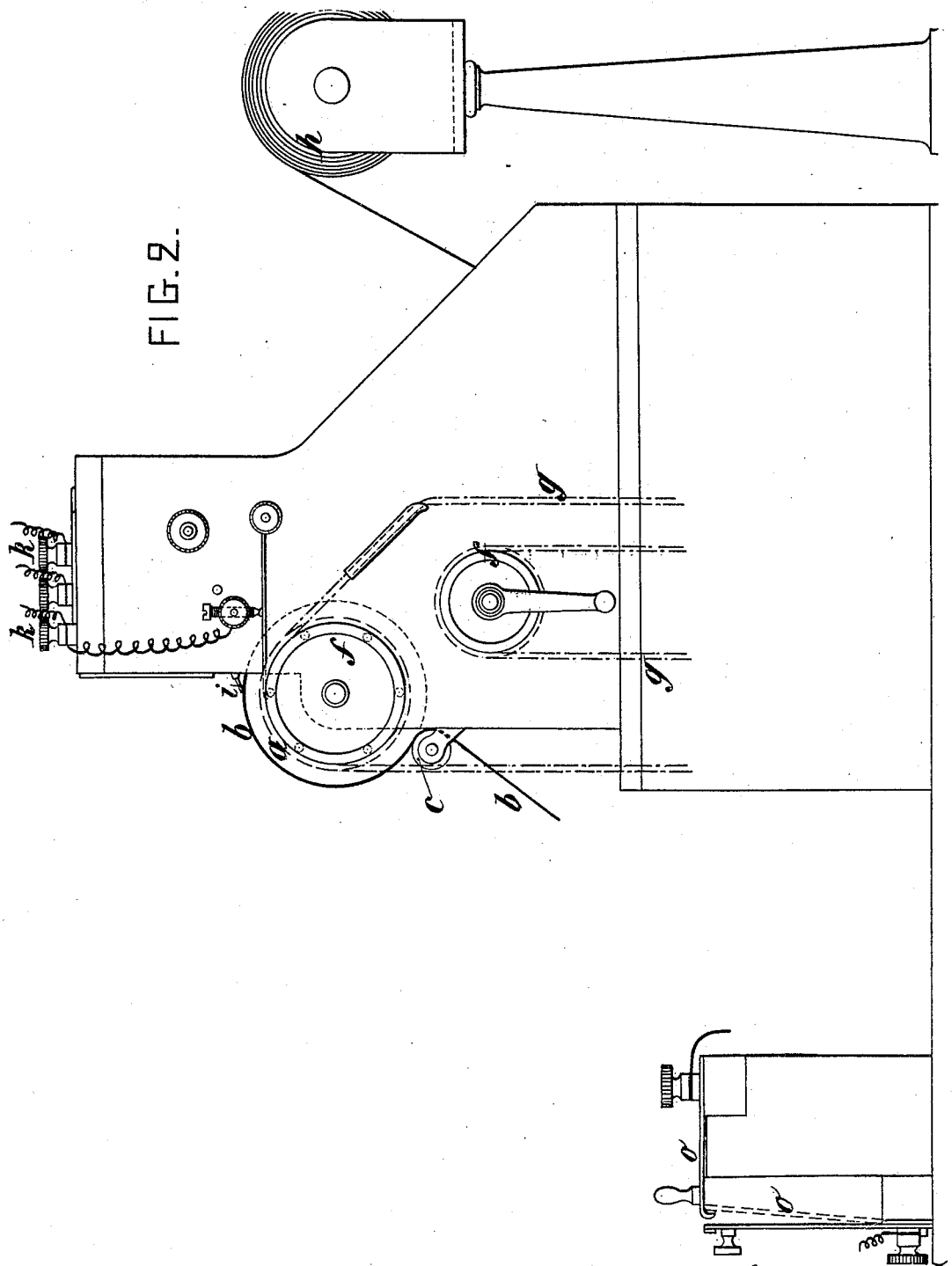

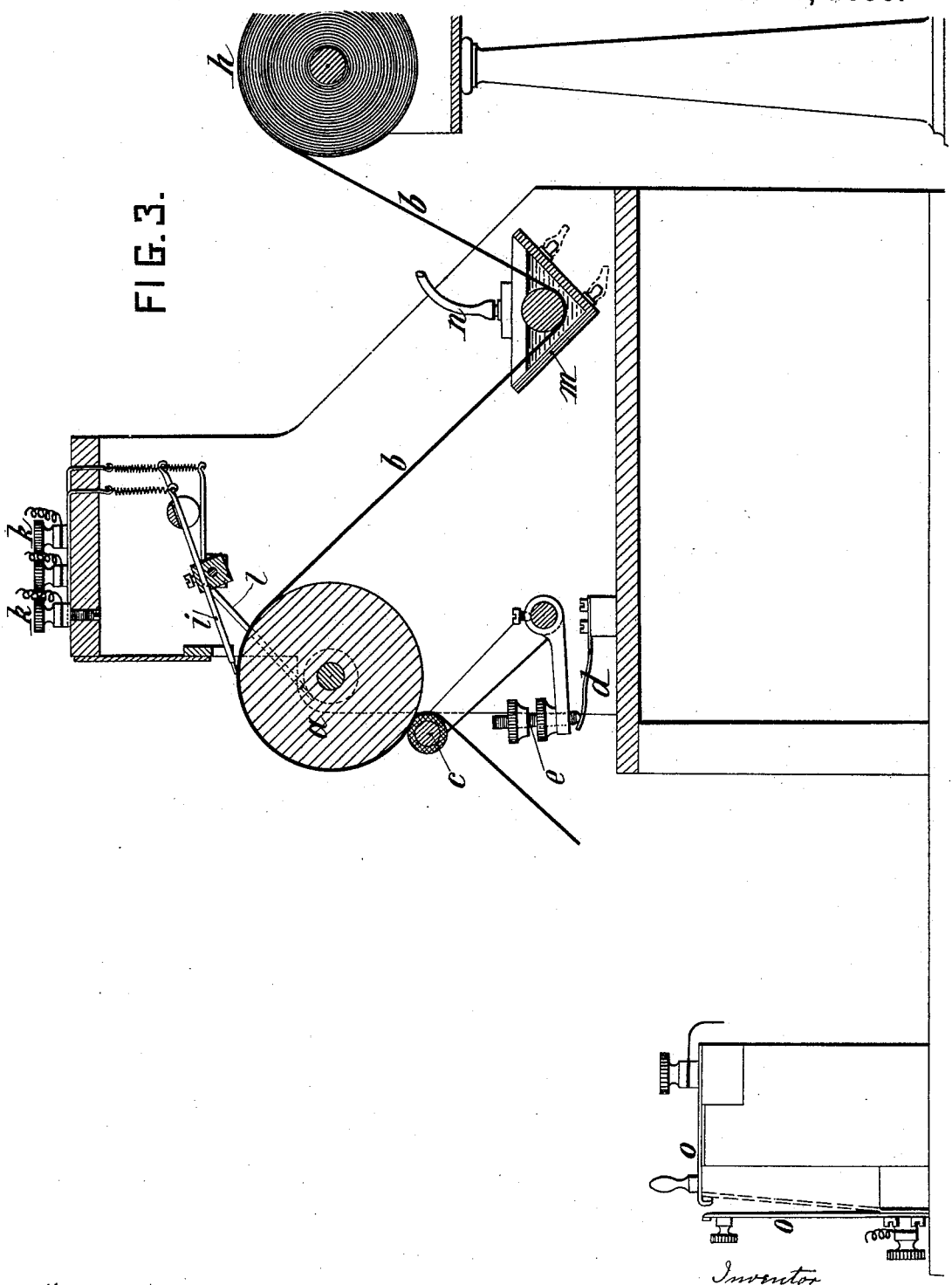

(No Model.)
J. S. H. PELLAT.
TRAIN SIGNALING APPARATUS.
No. 509,447. Patented Nov. 28, 1893.
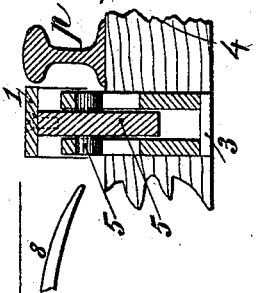
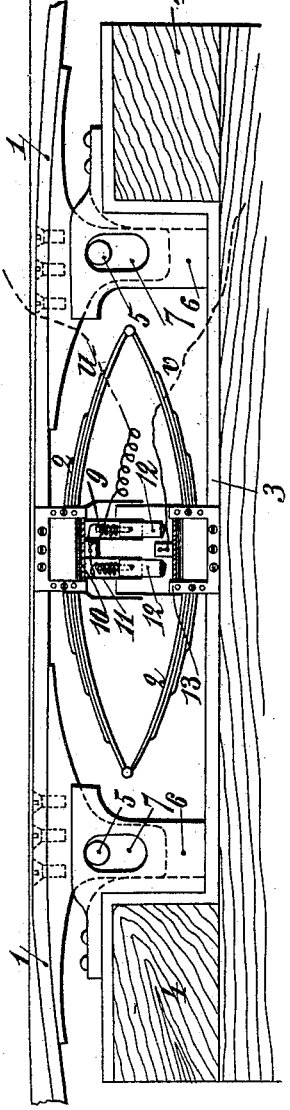
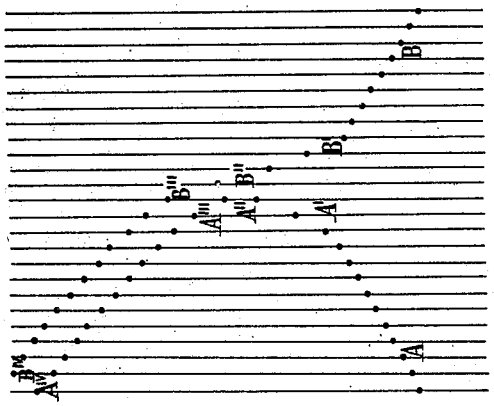

(No Model.) 7 Sheets—Sheet 5.

J. S. H. PELLAT.
TRAIN SIGNALING APPARATUS.

No. 509,447. Patented Nov. 28, 1893.

Witnesses:
L. M. Hachschlager
Charles E. Smith

Inventor
Joseph S. H. Pellat
By Briesen & Knauth
his Attorneys (No Model.) 7 Sheets—Sheet 6.

J. S. H. PELLAT.
TRAIN SIGNALING APPARATUS.

No. 509,447. Patented Nov. 28, 1893.

Witnesses:
L. M. Hechschlager
Charles C. Smith

Inventor
Joseph S. H. Pellat
By Briesen & Knauth
his Attorneys (No Model.) 7 Sheets—Sheet 7.
J. S. H. PELLAT.
TRAIN SIGNALING APPARATUS.
No. 509,447. Patented Nov. 28, 1893.

UNITED STATES PATENT OFFICE.

JOSEPH SOLANGE HENRI PELLAT, OF PARIS, FRANCE.

TRAIN SIGNALING APPARATUS.

SPECIFICATION forming part of Letters Patent No. 509,447, dated November 28, 1893.

Application filed August 10, 1892. Serial No. 442,721. (No model.)

*To all whom it may concern:*

Be it known that I, JOSEPH SOLANGE HENRI PELLAT, of the city of Paris, France, have invented Improvements in Train Signaling Apparatus, of which the following is a full, clear, and exact description.

My invention relates to a system of train-signaling apparatus and said invention consists in the novel combination and arrangement of parts hereinafter described and claimed.

The objects of my invention are, first, to obtain a graphic record of the movements of trains whose positions upon the line are automatically signalled to a central station; second, to transmit signals to the drivers of trains.

The system comprises mainly a recording apparatus placed in a signal station in charge of a section of the line, and contacts arranged along the line.

The recording apparatus, which is the essential part of the invention, is so arranged that every train on the line will inscribe its own diagram by tracing a series of dots upon a paper strip. The contacts arranged along the line are of two kinds, the function of the one being the production of the graphic record and that of the other being to put the signalman in communication with the engine drivers. By these means the supervisor stationed at the middle of a section of the line of, say, from fifty to one hundred kilometers in length can constantly observe the movements and respective positions of the various trains on that section and can tell at a glance whether there is danger of collision between trains following or approaching each other on the same line and can avert the accident by a warning signal to the drivers.

Reference is to be had to the accompanying drawings, forming part of this specification, in which—

Figure 1:
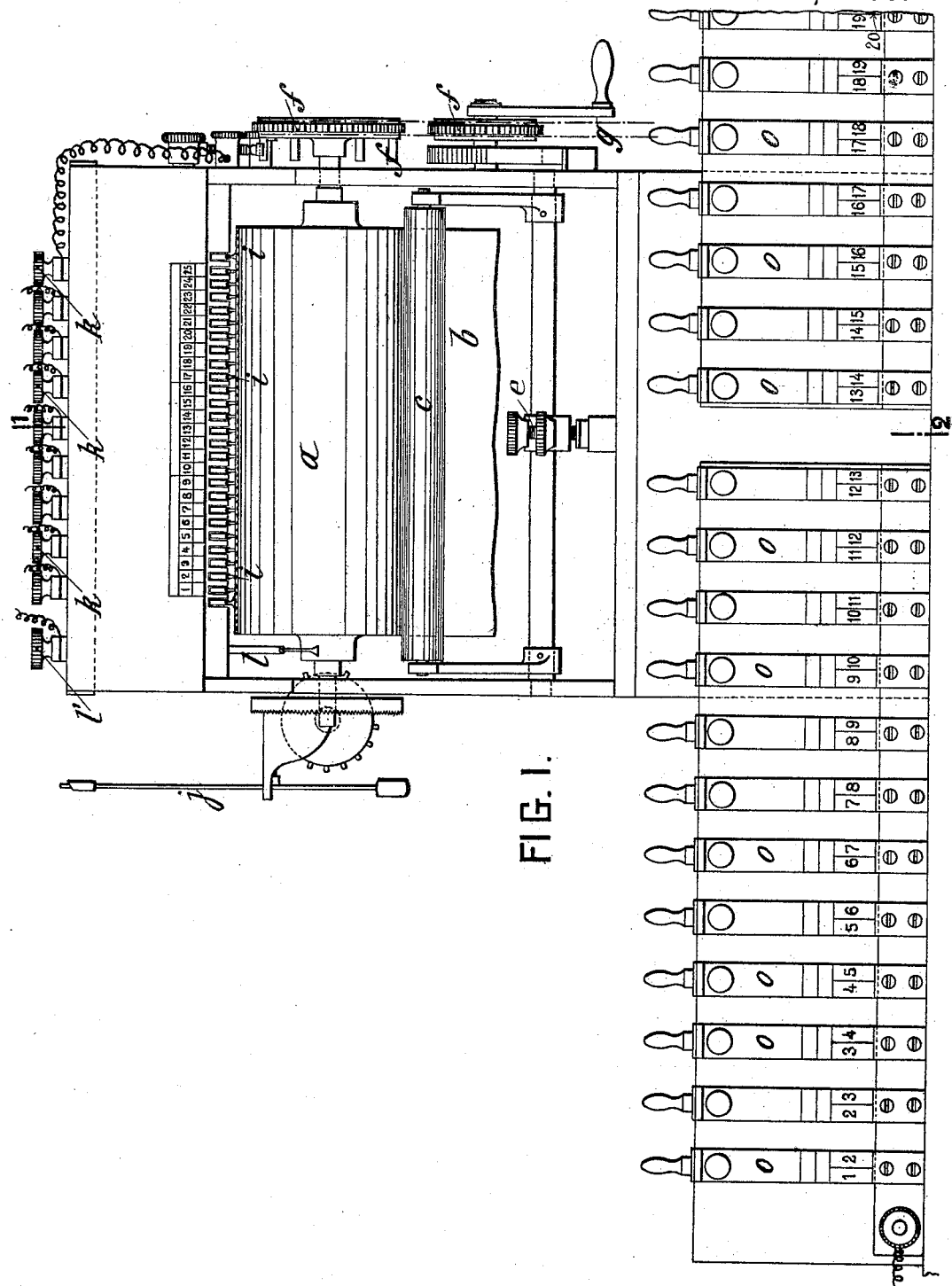
Figure 6:
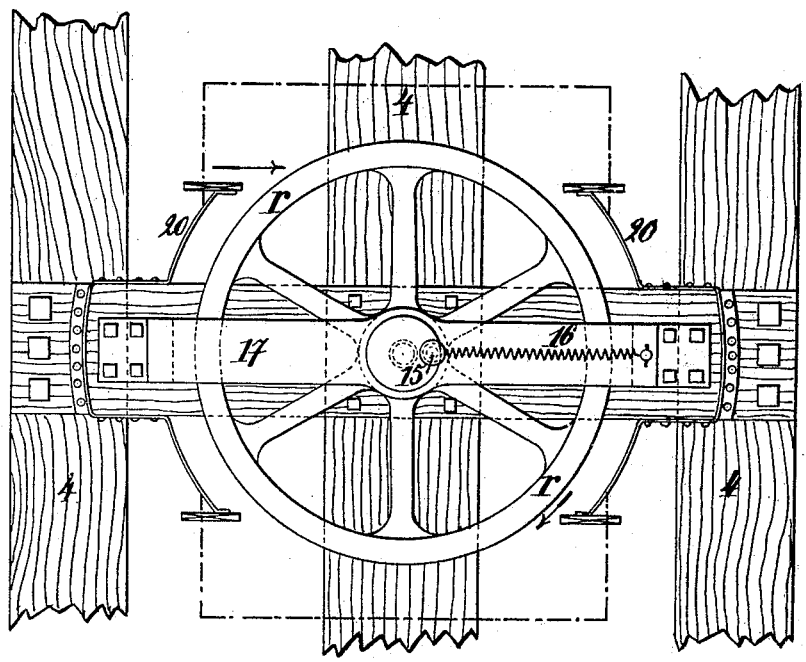
Figure 7:
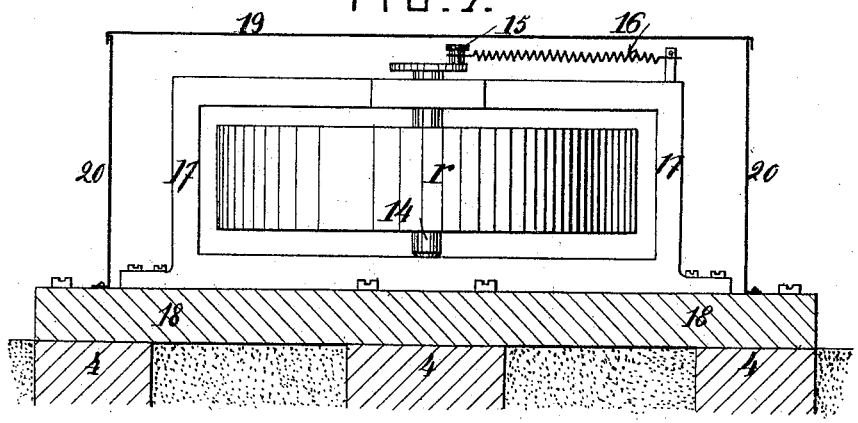
Figure 8:
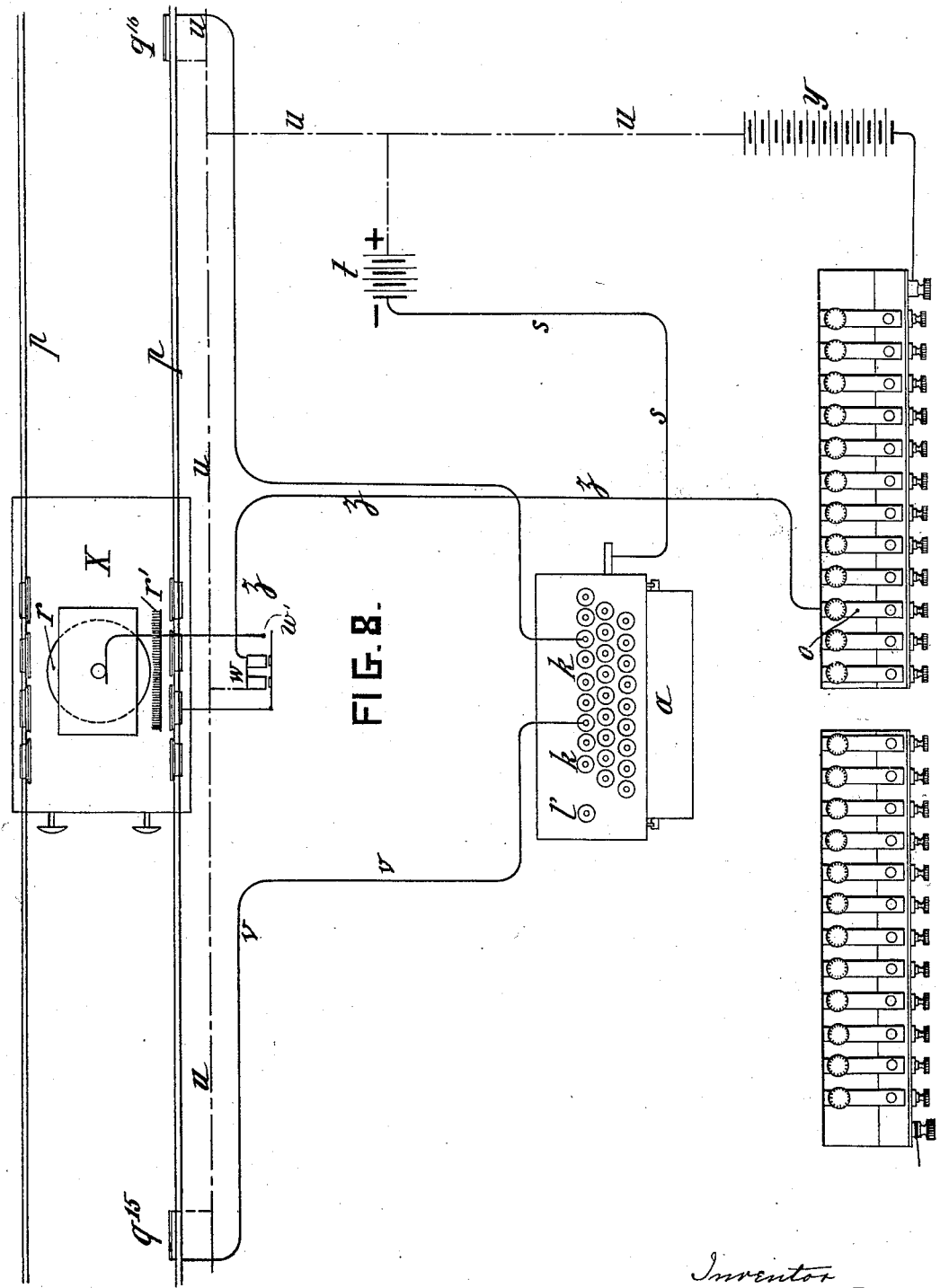
Figures 9, 10:
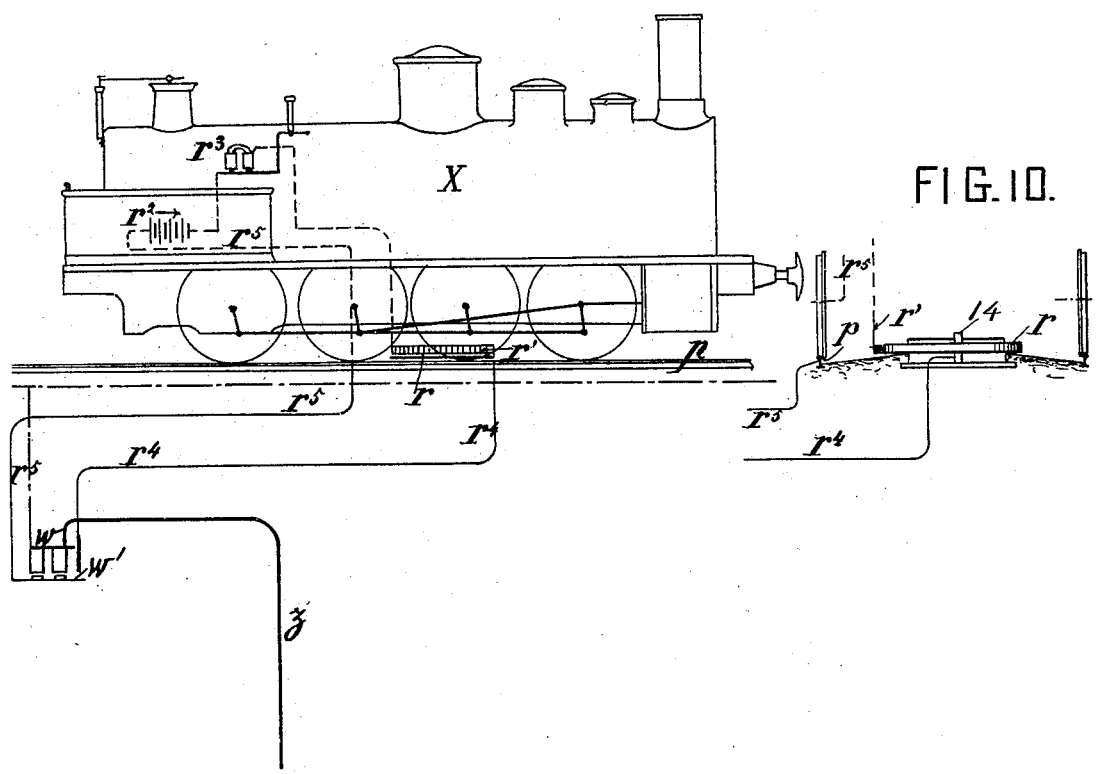

Figure 1 represents a front elevation, and Fig. 2 a side elevation of the graphic recorder placed at the central station of each section of the line. Fig. 3 is a vertical section of the same on line 1—2 Fig. 1. Fig. 4 is an elevation and Fig. 5 a transverse section of one of the contact treadles placed alongside the rail, whereby the graphic record is produced. Fig. 6 is a plan and Fig. 7 an elevation of a rotating contact placed between the rails for transmitting signals from the supervising station to the driver. Fig. 8 is a diagrammatic view showing the relative positions and mode of working of the various parts of the signaling apparatus. Fig. 9 shows the method of transmitting to the locomotive the signal sent from the supervising station. Fig. 10 shows the contact between the locomotive and the apparatus between the rails. Fig. 11 shows a portion of the paper strip upon which is traced the graphic record of the trains circulating on the line.

The same letters and numerals of reference indicate like parts in all the figures.

The recording apparatus represented in Figs. 1, 2, and 3, consists of a drum $a$ over which passes a band of paper $b$ taken from a reel $h$. This paper strip is pressed against the drum $a$ by a roller $c$, held in contact by a spring $d$, and regulating screw $e$ provided with a nut and jam nut. The drum $a$ is driven by gearing $f$ operated by a weight and chain $g$, or by a spring or other power, the movement being regulated by a suitable pendulum and escapement $j$, so that the paper will be moved at a rate of, say, four millimeters per minute. The paper $b$, supplied from a roll $h$ is first passed through a trough $m$ fed by a pipe $n$ and containing a solution of iodide of potassium diluted to, say, one one-hundred-and-fiftieth. The paper should be unsized but slightly starched. Above the drum $a$ are a series of platinum styluses $i$ which bear lightly upon the paper and communicate each with the positive pole of an electric generator by means of binding studs $k$, the drum $a$ being electrically connected with a negative pole by a contact strip $l$ and binding stud $l'$. In the circuit of each stylus $i$ is a treadle circuit closer operated by the engine. Upon the closing of its circuit the current from the stylus decomposes the salt in the paper strip and forms a black dot thereon by setting free the iodine. The series of dots thus produced constitutes a graphic record of the passage of the train over successive treadle circuit closers and enables the movements of all trains in the section to be constantly supervised at the central station. Thus the record shown in Fig. 11 indicates that two trains are moving toward each other, the one from A to A' and the other from B to B', upon the same line. To warn the drivers of the fact, the keys or circuit closers $o$ (Figs. 1, 2, 3, and 8,) placed in front of the recorder are used to close the circuits of corresponding contacts placed in such position that the engine will make contact therewith, so that when any one of the keys is closed, as shown in dotted lines in Figs. 2 and 3, in anticipation of the engine passing over the corresponding contact, a whistle, gong, or other warning signal placed on the engine will be operated when such passage occurs which, if such contacts are midway between the recording treadles, will be when the train arrives at the middle one of the sub-sections into which the section is divided. If, for example, the section is divided into twenty-four sub-sections by treadles numbered from 1 to 25 the first key establishes communication with the engine when on the first sub-section between treadles 1 and 2, the second key corresponds to the second sub-section between treadles 2 and 3, and so on, as indicated by the numeration of keys $o$ in Fig. 1.

In Fig. 8 $q^{15}$ $q^{16}$ are two consecutive recording treadles on a railway $p$ to which the fifteenth and sixteenth styluses $i$ of the recorder (Figs. 1, 2, and 3) correspond. $r$ is the contact placed between the rails midway between the treadles and connected to the key $o$, numbered 15 16 in Fig. 7. When the engine X passes the treadle $q^{15}$ the latter is depressed by the tire of one of the wheels and closes the circuit in which it is placed, whereby the current of the battery $t$ passes through the fifteenth stylus $i$ of the recorder, the course of the current being from the positive pole through the main conductor $u$ alongside the rails, shown in broken lines in Fig. 8, the treadle circuit closer $q^{15}$ and back by the special wire $v$ to the fifteenth stylus $i$ of the recorder, and thence to battery $t$ through the drum $a$ and wire $s$. The action is similar when the train passes over treadle $q^{16}$, the sixteenth stylus then coming into action and marking on the paper strip the next element of the graphic record. If it were required to signal the train to stop after passing treadle $q^{15}$, the key $o$ numbered 15 16 would be pressed to close the circuit of the battery $y$ through the main conductor $u$ and through the relay $w$ and wire $z$ whereby the relay closes at $w$ two portions of a local circuit respectively connected by $r^4$, $r^5$, with a rail $p$ and a contact wheel $r$. The remainder of the local circuit is carried by the engine X and comprises a local battery $r^2$ in electrical connection with the wheels and therefore with rail $p$, signal $r^3$ and brush contact $r'$ which as the engine passes over contact wheel $r$ completes the circuit of battery $r^2$ through the signal $r^3$, brush $r'$, wheel $r$, wires $r^4$ $r^5$, the rail $p$, and the wheels of the engine.

The movements of the trains can be readily followed on the paper strip, Fig. 11, which shows two trains advancing toward each other from A to A' and from B to B' respectively. On arriving at A' B' the drivers will receive a signal and slacken speed until on the trains sighting each other at A'' B'', train A$^{iv}$ while train B will follow it at a suitable distance from B'' to B$^{iv}$.

The invention is not limited to the treadles and contacts shown in Figs. 4, 5, 6 and 7, although they may advantageously be used. The treadle shown in Figs. 4 and 5 is composed essentially of a bar 1 placed on the inside of the rail $p$ and carried by an elliptical spring 2 mounted upon a metal base plate 3 bolted to the sleepers 4. The bar 1 has downwardly curved ends 8 and is guided by studs 5 working in slots 7 in brackets 6. At mid-length of bar 1 is fixed an insulated plate 10 from which project downward two tubes 11 in which slide contact studs 12 connected to plate 10 by flexible conductors 9. The plate 10 is connected with the part $u$ of the recording circuit while the other part $v$ of said circuit connects with a second insulated plate 13 upon which by the depression of the bar 1 the studs 12 are caused to press, thus closing the circuit which is broken by spring 2 when the wheel ceases to press on the treadle. The contact represented in Figs. 6 and 7, which is used for the purpose described in reference to Figs. 8 and 9, consists of a wheel $r$ mounted to rotate upon a vertical spindle 14 provided with a crank stud 15 to which is attached a spring 16 whose other end is connected to the bracket 17 which is mounted upon a wood block 18 fixed to the sleepers 4. The drum is protected from the weather by a sheet iron cover 19 and a casing 20 open at the sides to allow the drum to project for contact by the brush carried by the engine. The brush in passing the drum causes it to rotate and the spring 16 returns it to the position of rest. Any other arrangements of treadles and contacts may be used in combination with the recording apparatus, which constitutes the essential feature of the invention.

I claim—

1. In a train signaling apparatus, the combination of the following instrumentalities, viz: a series of train operated circuit closers arranged along a railway line, a series of styluses 1, 2, 3, &c., placed at intervals along the axial line of a drum $a$ which is connected to one pole of the battery, each circuit closer being connected to the other pole of the battery, and being in a separate circuit with its correspondingly located stylus, a uniformly moving band $b$ of suitably prepared paper passing between the drum and the styluses, whereby, as the train proceeds, and successively effects the closure of the circuit of each stylus, a dot is marked on the moving paper at the corresponding stylus which indicates the position of the train upon the line, the series of dots thus produced forming a curve of the progress of the train in rectangular co-ordinates, substantially as described.

2. In a train signaling apparatus, the combination of the following instrumentalities, viz: a series of train operated circuit closers arranged along a railway line, a series of styluses 1, 2, 3, &c., placed at intervals along the axial line of a drum $a$ which is connected to one pole of the battery, each circuit closer being connected to the other pole of the battery, and being in a separate circuit with its correspondingly located stylus, and a uniformly moving band $b$ of suitably prepared paper passing between the drum and the styluses, whereby, as the train proceeds and successively effects the closure of the circuit of each stylus, a dot is marked on the moving paper at the corresponding stylus which indicates the position of the train upon the line, together with contacts $r$ arranged along the line intermediate of the circuit closers and normally in an open local circuit with a rail of the track, a series of keys connected in circuit with relays $w$ serving to close circuit between the contacts and the rail, and circuit terminals upon a car for completing the circuit between the rail and the contact $r$ having in the circuit therewith signaling devices upon the car, substantially as described.

The foregoing specification of my improvements in train signaling apparatus signed by me this 5th day of July, 1892.

JOSEPH SOLANGE HENRI PELLAT.

Witnesses:
ROBT. M. HOOPER,
ALBERT MOREAU.